Patented Nov. 6, 1928.

1,690,359

UNITED STATES PATENT OFFICE.

CHARLES R. BROWN, OF KANSAS CITY, MISSOURI, AND HUBERT E. NELSON, OF KEOKUK, IOWA.

PROCESS OF MANUFACTURING CORN SUGAR.

No Drawing.     Application filed October 31, 1925. Serial No. 65,948.

Our invention relates to a new and improved process for manufacturing corn sugar (dextrose) and glucose from corn which process results in the procurement of exceedingly pure end products.

Our invention has special reference to a new and simplified method for treating corn to produce dextrose, such as corn sugar and glucose, whereby the major portion of the impurities heretofore present throughout the various steps in the prior processes are removed from the corn prior to the "steeping". As a result, the process of our present invention is economical to practice while, at the same time, exceptionally pure glucose or corn sugar, as desired, are produced.

One object of our invention is to provide a process of the character indicated which is simple and economical to practice and results in a very high yield of glucose or corn sugar from the corn.

Another object of our invention is to provide corn sugar and glucose that are exceptionally pure and free from any sulphur compounds and iron compounds, such as sulphur dioxide and insoluble iron phosphates, that are usually present in greater or less degree in the end products resulting from present day methods of manufacture.

Other objects and advantages accruing by the use of our present invention will be apparent to those skilled in the art from the following description, to which reference may now be had.

Heretofore in the manufacture of starch and glucose from corn or other plant tissues the process has been a prolonged one entailing the steeping of the corn for a considerable period in steeping tubs. This steeping, in the usual commercial process, consisted in subjecting the corn to a sulphurous acid-water bath for a period of from 50 to 60 hours or until this bath softened sufficiently the glutinous parts and hulls of the kernel. During this time it was essential to preclude undesirable fermentative changes in the corn and, consequently, the sulphurous acid served this purpose also. The corn kernels, of course, during the steeping remained unbroken and the hulls, the germs and other glutinous and fibrous substances, as well as the starch contained in the corn kernels, were subjected to this sulphurous acid-water bath. In view of the fact that steeping tubs embody in their construction large amounts of iron which came into intimate contact with the sulphurous acid-water bath considerable quantities of iron were dissolved which iron, in contact with the phosphates in the corn kernels, combined to form insoluble iron phosphates which were very difficult to remove in the subsequent treating of the corn to produce starch or glucose and the other by-products. In fact, the dissolved iron which formed these insoluble iron phosphates was, in some instances, a serious menace in the procurement of economical quantities of commercially pure starch, as well as glucose. Moreover, the sulphur dioxide ($SO_2$), derived from the sulphurous acid-water bath was very difficult to eliminate from the refined end products, such as the commercial starch and the commercial glucose.

After the unbroken corn kernels with their hulls, germs, glutinous parts, etc. had been steeped it was necessary to subject them to prolonged processing in order to secure the starch in a sufficiently pure state to convert it into glucose or, in the event that glucose was not desired, to procure commercially pure starch.

We will briefly describe the usual commercial process heretofore practiced for procuring commercial starch and glucose as the end products in order that it may be perceived how involved and prolonged this old process was. The whole corn was steeped in a .3 per cent sulphurous acid-water bath where the corn was kept for from 50 to 60 hours. As hereinbefore explained, insoluble iron compounds and other impurities resulted from this prolonged steeping process in the sulphurous acid-water bath and it was very difficult to remove these impurities on subsequent treatment of the corn. On account of the length of the time required to steep the whole corn, namely from 50 to 60 hours, there is a considerable breaking down of the initially insoluble substances in the corn kernels into soluble substances. Also, the soluble proteins which are mainly in the germs of the kernels are broken down into amino acids which latter have little or no food value.

From the steeping tubs, the softened but unbroken corn kernels were fed to degerminating mills where the whole corn kernels were cracked or broken up in order to break off the germ from the remaining part of the kernel. From the degerminating mills the broken up corn kernels including the germs, the hulls, glutinous and fibrous parts were fed to germ separators. Usually a first germ separator was employed in order to remove initially the greater portion of the germs from the rest of the corn kernels and from the first germ separator, the materials being processed were then conducted to a second degerminating mill where the materials were subjected to further breaking up and grinding. From this second degerminating mill, the materials were fed to a second germ separator.

The germ separators served the purpose of segregating the germ from the rest of the corn kernel whereby the germ could be treated separately for the purpose of securing by-products.

The materials which now comprise the hulls, the corn grits and other impurities were then led to copper reels to segregate the hulls and then to grit shakers to segregate the corn grits. A portion of the starch liquor procured at this stage of the process was returned into the system for the purpose of maintaining proper gravities, while the major portion of the starch liquor from the copper reels and grit shakers was led to a steeping table. The hulls from the copper reels and corn grits from the grit shakers were then fed to buhr mills where further grinding of these materials was carried on. From the buhr mills the materials were led to copper reels and then to silk reels, known in the art as No. 17 silk reels. The residue slop taken from the copper reels, and the No. 17 tailings taken from the said No. 17 silk reels thus were separated from the starch liquor. The washing of the starch from this slop and the No. 17 tailings was always watched carefully in order to recover as much starch as possible. The starch liquor flowing from the copper reels and the No. 17 silk reels was then conducted to a settling table where the starch was deposited. It was frequently necessary to either carefully wash the starch on continuous filters or retable the starch in order to remove the impurities therefrom, such as the insoluble iron compounds mentioned above and other impurities resulting from the imperfect method of steeping the whole corn kernels and then the grinding of them into a conglomerate from which it was attempted to separate subsequently the starch. In many instances, it has not been possible to purify satisfactorily the starch in order to ensure a commercially satisfactory product or to ensure a substantially pure quality of commercial glucose which is manufactured from the starch. The foregoing is a very brief outline of the old process for securing starch from corn.

It will be observed that the old process was a prolonged one which required a considerable time to practice, as well as very expensive apparatus. Moreover, the starch procured as the end product was but a part of the starch content initially present in the corn, since a great deal of the original starch content was lost in the various reels, grinding mills, shakers, separators and washings. Other disadvantages present in the old process were that the sewage was particularly objectionable because of the fact that the whole corn leaving the steeping tubs was high in solubles, particularly soluble proteins. The gluten procured from the old process was in a very impure state because of the impurities present which were difficult to remove. However, one of the most serious objections to the foregoing process was that the impurities and particularly the insoluble iron compounds, such as have been hereinbefore described, were very difficult to remove and in some instances have been present in such quantities that the final end products of starch and glucose have been unmarketable.

We have invented a new process for removing effectively from the materials being processed such iron compounds and other impurities while practicing the old method outlined above of manufacturing starch and glucose from the whole corn and this new process has been described in our copending application, Serial No. 65,949, filed October 31, 1925, and entitled Process of manufacturing starch and glucose.

It is to be observed, however, that the process of this instant application is not to be considered the same as the process disclosed in our above identified application, since both of these inventions are patentably distinguishable from each other.

In the process of this present invention we are able to eliminate most of the difficulties heretofore present in the manufacture of starch and glucose from corn. Moreover, by means of our new process we are able to secure as end products substantially pure starch which is devoid of impurities and particularly insoluble iron compounds, as well as any traces of sulphur dioxide. The glucose procured from such pure starch is, of course, a highly satisfactory product, inasmuch as all impurities have been substantially eliminated therefrom. In addition to procuring very satisfactory end products, such as the starch and/or glucose, we are able by our new process to get substantially a 100% yield of starch from the corn and by employing the process of our present invention no objectionable sewage is produced. Again, the gluten, which is procured as a by-product, is in edible form and contains very little starch. Hence, such gluten is highly satisfactory as a food for diabetics. Furthermore, other by-products, such as the oils, are in an exceptionally pure state which adapts them for industrial purposes. The advantages accruing from the short process of our present invention will, of course, be apparent and, since our new process is a simple one to practice, the cost of the manufacturing equipment is low.

The process of our present invention contemplates that the corn kernels or other plant tissues be first steamed and then cracked in a degerminating mill and subjected to a system of jigs and fans, as are well known in the art of manufacturing corn grits, in order to remove substantially completely the germs, the hulls and the fibrous substances from the remaining parts or grits of the corn kernels. We retain from this cracking operation the corn grits which are substantially the same as the present day commercial corn grits. The step in our process whereby these corn grits are procured may be substantially the same as the well known process employed at present for manufacturing corn grits and corn meal. Inasmuch as the germs, the hulls and the fibrous substances of the corn kernels contain about three fourths of the soluble materials in the original corn kernels, the remaining corn grits contain comparatively few of the solubles and, therefore, the corn grits, which are subsequently treated in our process to produce the starch or glucose therefrom, inject very few impurities into the process as it is proceeded with. The corn grits that we employ for further processing contain about 25 per cent of the solubles initially present in the corn kernels. As a specific illustrative example of our process, these corn grits are then steeped for a short time in a substantially .03 per cent acid-water bath which is maintained at a temperature in the neighborhood of from 120° F. to 130° F. We have found that steeping these corn grits for a few hours in a hydrochloric acid-water bath of the concentration mentioned above produces very satisfactory end products. Of course, the acid-water bath should comprise just enough acid to change the basic salts in the corn grits to the acid forms of the same salts. While we describe an hydrochloric acid water bath having an HCl concentration of .03 per cent, it is obvious that the acid concentration of the bath will vary with different grades and species of corn, but our invention contemplates such an acid concentration of the bath that substantially all of the basic salts in the corn grits will be changed to acid salts when subjected to the desired temperature. Because of the weak concentration of the acid in this steeping bath and the short time to which the grits are subjected to treatment therein, there is no breaking down of the protein and other materials contained in the corn grits but, since the initial raw corn is in the form of grits, the soluble materials are readily dissolved. We have found that the steeping of the corn grits in this weak acid bath is required for 6 to 12 hours only, while the bath is heated at the temperatures indicated above.

Inasmuch as the corn kernels have been broken up and the grits are employed only, the grits are subjected to rapid diffusion by the acid-water bath. Again, the acid-water bath is of such low concentration that practically or substantially no iron from the steeping tubs and other apparatus is dissolved and, therefore, there are no iron impurities to be subsequently removed from the materials being processed. This immediately insures, of course, end products of a high degree of purity. Moreover, since no sulphurous acid is employed in the steeping process the final end products, namely, the starch and the glucose are entirely devoid of any impurities resulting from sulphur dioxide.

Since the steeping step of our new process lasts for a relatively short time as compared to the steeping step employed in the old process, which usually required 50 to 60 hours, no precautions need be taken to preclude fermentation of the corn.

After the grits have been steeped in the above-mentioned acid-water bath and washed they may contain as little as ½ per cent of soluble materials and, therefore, constitute substantially pure starch and gluten.

Since substantially all of the soluble proteins in the original corn kernels are contained in the germs and since the germs have been segregated from the corn grits before subjecting the grits to the steeping step, there is no breaking down of the soluble proteins to amino acids which heretofore have been considered undesirable.

As we have mentioned above, the grits are steeped in the acid-water bath of low concentration and washed until they contain about ½ per cent of soluble material. Since most of the phosphates initially contained in the corn kernels were removed at the time of the segregating of the corn grits, and since the weak acid-water bath dissolves substantially no iron during the time that the grits are being processed in the steeping tubs, the corn grits, after steeping and washing will contain substantially no insoluble iron phosphates and similar impurities but are in a sufficiently pure state to be led directly to the glucose converters, if glucose is the desired end product. However, the grits may, if desired, be ground before feeding them to the converters. Since our steeping step is of such short duration and the grits are fed to the converters directly at the conclusion of the steeping step, fermentation of the materials being processed is entirely eliminated.

The steeping water which is devoid of much refuse and the water employed in washing the corn grits subsequent to the steeping step, may be readily evaporated and, consequently, the soluble material removed from the corn grits may thusly be utilized as feed.

The washed grits may be either pulverized or not, in the event they are to be fed to the converters for the procurement of glucose. Since the grits, after being steeped are substantially pure starch and gluten, they may be converted directly into glucose. It is, therefore, apparent that the present process is highly advantageous over the old process heretofore practiced, inasmuch as a number of steps have been eliminated, such steps comprising shakers, grit removers, reels, grinders and various other steps which add greatly to the cost of manufacturing glucose and starch.

After the grits have been fed to the converters they may be treated in the following manner in order to procure glucose, but it is to be understood that we are not to be limited to any specific process for converting the starch obtained from the grits into glucose and other end products. The grits are run into the converters with sufficient hydrochloric acid, preferably a concentration of substantially .1 per cent, and subjected herein to a pressure of from 30 to 40 lbs. per square inch, until hydrolyzation is carried to the desired point; that is to say, the liquor has reached the desired dextrose content, which may vary from 30 to 50 per cent for commercial glucose, and from 75 to 90 per cent for corn sugar liquor and still higher for pure dextrose. The converter liquor is then discharged into the neutralizing tub where this liquor is neutralized preferably with a dilute solution of sodium carbonate. The neutralization is effected in two steps, instead of one step as is practiced in the present methods. The first neutralization consists in adding sufficient sodium carbonate solution to the converter liquor until the first break occurs. This break will occur at a hydrogen ion concentration of substantially pH 3.5 to pH 4.0. When the "first break" occurs, the neutralization has proceeded to such a point that the impurities have coagulated so as to visibly separate out or precipitate from the solution. The liquor is then filtered to remove substantially all of the remaining solid gluten, which is present in granular form, and the fiber. The filtered liquor comprises glucose, which is hydrolyzed starch, the palmitates which appear in the form of an emulsion, and some gluten soluble and insoluble herein present by reason of colloidal suspension.

As an alternative for the foregoing first step in the neutralization of the converter liquor the corn grits, after leaving the steeping tubs wherein they are subjected to the water-hydrochloric acid bath described above, are diluted with water to a gravity of 14 to 20° Bé. and are placed in a converter or converters, either open or closed, where, with the addition of a requisite amount of hydrochloric acid and sufficient heat to effect hydrolysis, they are treated until substantially all of the starch is hydrolized and the resultant liquor is raised to the desired degree of purity, as hereinbefore explained. This liquor is then removed from the converters and fed to a neutralizer where the first neutralization with sodium carbonate takes place, as described in connection with the first mode of procedure. This liquor from the first neutralization is then filtered.

This filtered liquor from the first neutralization, irrespective of whether the first described procedure or the second described procedure is followed, is then subjected to a second neutralization to bring it to a hydrogen ion concentration of substantially pH 6.0 to pH 6.5. This liquor is then filtered and the residue is a mud rich in palmitates and possessing a light yellow color. This mud may be subsequently treated in order to remove the palmitates by extraction or autoclaving.

The palmitates are oily substances having a wide industrial use and by reason of their being obtained in such a pure state are highly satisfactory.

The filtered liquor from this second neutralization is the crude glucose and at this point contains no insoluble iron substances nor sulphur dioxide. This glucose is then subjected to the regular well known refining method.

In the event that dry starch is desired as an end product, the grits as they are taken from the steeping tubs are washed and pulverized and the wet pulverized grits are then run to a settling table where part of the starch remains. This starch is now fit for commerce. The material running off from the settling table consists of a mixture of starch and gluten and this material may be settled and subsequently fed into converters where the starch is converted into corn syrup or corn sugar, as heretofore practiced.

From the foregoing description of our present invention it will be noted that a very high yield of starch or of glucose, as desired, may be procured from the corn. By proceeding carefully and expertly in our present process of manufacture it is conceivable that substantially a 100 per cent yield of the dry starch in the corn may be recovered. Inasmuch as the highly objectionable impurities are removed at the initial stage of our process, namely at the time of the procurement of the corn grits, no objectionable sewage develops during the practicing of our present process. Again, the solubles present in the corn grits have been recovered in a substantially pure state except that they have been changed from basic salts to acid salts and in view of the fact that the major portion of the impurities have been eliminated, the resulting gluten may be recovered in usable form and possessing a very low starch content. In view of the fact that our process is a decidedly short one, the cost of manufacture will be lessened considerably and since the apparatus and equipment necessary to practice our process is very limited, the cost of installing apparatus for processing corn, as we have heretofore described, is relatively low.

While we have mentioned that hydrochloric acid may be employed in the acid-water bath for steeping the grits, it is to be understood that other acids and substances may be used in this steeping bath providing they serve the same purpose in dissolving out the solubles in the corn grits without affecting their subsequent usability for the procurement of commercial starch and glucose, as well as the other by-products and, therefore, we intend that our invention cover all such baths that function in the manner aforesaid.

While we have herein described our invention, it is to be understood that many modifications may be made therein without departing from the spirit and scope of the appended claims.

We claim:

1. In the manufacture of glucose and corn sugar from corn grits that have been prepared by cracking, degerminating and dehulling of corn kernels, that step which comprises treating said corn grits with a dilute mineral acid of a concentration just sufficient to solubilize basic salts contained in said corn grits and washing said grits prior to further treatment.

2. In the manufacture of glucose and corn sugar from corn grits that have been prepared by cracking, degerminating and dehulling of corn kernels, that step which comprises treating said corn grits with dilute hydrochloric acid of a concentration just sufficient to solubilize basic salts contained in said corn grits and washing said grits prior to further treatment.

3. In the manufacture of glucose and corn sugar from corn grits that have been prepared by cracking, degerminating and dehulling of corn kernels, that step which comprises treating said corn grits with dilute hydrochloric acid of a concentration of not substantially over 0.03% to solubilize basic salts contained in said corn grits and washing said grits prior to further treatment.

4. The process of manufacturing glucose from corn which comprises removing the germs and hulls from the corn kernels to form corn grits, steeping said grits in a hydrochloric acid bath of substantially 0.03% HCl strength in order to dissolve substantially all of the insolubles therein, washing said grits to remove the impurities therefrom, processing said grits to hydrolyze substantially all of the starch therein, neutralizing said material, filtering the material being processed, subjecting said materials to a second neutralization, and then filtering the material being processed.

5. The process of manufacturing glucose which comprises steeping corn grits in a solution containing mineral acid of a concentration sufficient only to solubilize the insoluble salts contained therein, then washing the grits to remove therefrom the thus solubilized salts, and then converting the starch contained in said grits into glucose.

6. The process for manufacturing glucose which comprises steeping corn grits in a solution containing not over 0.03% hydrochloric acid to solubilize the insoluble salts contained therein, then washing the grits to remove therefrom the thus solubilized salts, and then converting the starch contained in said grits into glucose.

7. The process of manufacturing glucose from starch which comprises treating the liquor which is obtained by boiling said starch with an acid in a converter with a neutralizing agent to effect neutralization of said liquor to a pH concentration of 3.5–4.0, then filtering the solution, then completing the neutralization thereof to a pH concentration of 6.0–6.5, then filtering the solution, and then processing the filtrate to produce glucose in the usual manner.

8. The process of manufacturing glucose from starchy materials which comprises treating the liquor which is obtained by boiling said starchy materials with an acid in a converter with a neutralizing agent to effect neutralization thereof to a pH concentration of 3.5–4.0, filtering the solution, then completing the neutralization of said filtrate to a pH concentration of 6.0–6.5, filtering this solution, and processing the resulting filtrate to procure glucose.

9. The process of manufacturing glucose from corn grits which comprises treating the liquor which is obtained by boiling said corn grits with an acid in a converter with a neutralizing agent to effect neutralization thereof in two stages separated from each other by an intervening filtration, the first stage being carried to a pH concentration of 3.5–4.0 and the second stage being carried to a pH concentration of 6.0–6.5, then filtering the liquor after said second stage of neutralization, and then processing the filtrate to produce glucose in the usual manner.

10. In the manufacture of glucose, the step which comprises neutralizing the converted starch liquor in two stages separated by an intervening filtration, the first stage carrying the neutralization to a pH concentration of 3.5–4.0 and the second stage carrying the neutralization to a pH concentration of 6.0–6.5.

11. The process of manufacturing glucose which comprises steeping corn grits in a mineral acid solution of such concentration that only the normally insoluble basic salts in said grits are solubilized, washing said grits to remove the thus solubilized basic salts therefrom, processing said grits to hydrolyze substantially all of the starch therein, partially neutralizing said hydrolyzed material, filtering the same, treating the filtrate to complete substantially the neutralization thereof, filtering the same, and then processing the filtrate to procure glucose.

12. The process of manufacturing glucose which comprises steeping corn grits in an hydrochloric acid solution of a concentration of substantially .03%, washing said grits to remove therefrom the thus solubilized materials, processing said grits to hydrolyze substantially all of the starch therein, treating said hydrolyzed material with a neutralizing agent to bring the hydrogen ion concentration thereof to substantially a pH of 3.5–4.0, filtering the same, then treating the resulting filtrate with a neutralizing agent to bring the hydrogen ion concentration thereof to substantially a pH of 6.0 to 6.5, and then processing the filtrate to procure glucose.

13. The process of manufacturing corn sugar and glucose from corn kernels which comprises steaming corn kernels; cracking them in degerminating mills and removing hulls and germs therefrom forming corn grits; steeping said grits in a solution of a mineral acid of a concentration just sufficient to solubilize the therein contained basic salts; washing the thus solubilized salts from the grits; and then processing the same to procure corn sugar or glucose.

14. The process of manufacturing corn sugar and glucose from corn kernels which comprises steaming corn kernels; cracking them in degerminating mills and removing hulls and germs therefrom forming corn grits; steeping said grits in a solution of hydrochloric acid of a concentration just sufficient to solubilize the therein contained basic salts; washing the thus solubilized salts from the grits; and then processing the same to procure corn sugar or glucose.

15. The process of manufacturing corn sugar and glucose from corn kernels which comprises steaming corn kernels; cracking them in degerminating mills and removing hulls and germs therefrom forming corn grits; steeping said grits in a solution of hydrochloric acid of a concentration of not substantially over 0.03% to solubilize the therein contained basic salts; washing the thus solubilized salts from the grits; and then processing them in order to procure corn sugar or glucose.

In witness whereof, we have hereunto subscribed our names.

CHARLES R. BROWN.
HUBERT E. NELSON